United States Patent
Furuta et al.

(10) Patent No.: US 8,776,253 B2
(45) Date of Patent: Jul. 8, 2014

(54) AUTHORITY CHANGING DEVICE, GENERATING DEVICE, AND COMPUTER PROGRAM PRODUCT

(71) Applicants: Kenichiro Furuta, Tokyo (JP); Satoshi Ito, Tokyo (JP); Haruhiko Toyama, Kanagawa (JP); Hiroshi Isozaki, Kanagawa (JP); Toshiaki Asano, Saitama (JP)

(72) Inventors: Kenichiro Furuta, Tokyo (JP); Satoshi Ito, Tokyo (JP); Haruhiko Toyama, Kanagawa (JP); Hiroshi Isozaki, Kanagawa (JP); Toshiaki Asano, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 17 days.

(21) Appl. No.: 13/729,372

(22) Filed: Dec. 28, 2012

(65) Prior Publication Data

US 2013/0247211 A1 Sep. 19, 2013

(30) Foreign Application Priority Data

Mar. 19, 2012 (JP) ................................. 2012-062290

(51) Int. Cl.
*G06F 7/04* (2006.01)
*G06F 17/30* (2006.01)

(52) U.S. Cl.
USPC .................................. 726/26; 726/2; 709/225

(58) Field of Classification Search
None
See application file for complete search history.

(56) References Cited

U.S. PATENT DOCUMENTS

| | | | | |
|---|---|---|---|---|
| 6,772,157 B2 * | 8/2004 | Barnett et al. | | 1/1 |
| 7,865,595 B2 * | 1/2011 | Tatsubori et al. | | 709/225 |
| 8,145,572 B2 * | 3/2012 | Ito | | 705/59 |
| 8,250,628 B2 * | 8/2012 | Brodfuehrer et al. | | 726/2 |
| 2003/0088767 A1 * | 5/2003 | Emerson, III | | 713/153 |
| 2006/0242688 A1 * | 10/2006 | Paramasivam et al. | | 726/5 |
| 2011/0055902 A1 * | 3/2011 | Brodfuehrer et al. | | 726/4 |
| 2013/0312069 A1 * | 11/2013 | Kuritzky et al. | | 726/4 |

OTHER PUBLICATIONS

IEC 62351-8, International Standard by International Electrotechnical Commission, (Draft Technical Specification), Jun. 17, 2011, 44 pgs.

* cited by examiner

*Primary Examiner* — Fikremariam A Yalew
(74) *Attorney, Agent, or Firm* — Nixon & Vanderhye, P.C.

(57) ABSTRACT

According to an embodiment, an authority changing device includes a first determiner, a second determiner, and a changing unit. A first authority is defined by a first combination of first to third item values, and a second authority is defined by a second combination of the fourth to sixth item values. The first determiner uses a logical expression to determine whether the change from the first authority to the second authority is possible, not possible, or unknown. The second determiner uses a first table to determine the availability of change from the first authority to the second authority when the availability of the change is determined to be unknown. The changing unit changes the first authority to the second authority when the change is determined to be possible.

10 Claims, 9 Drawing Sheets

ITEM VALUE BEFORE CHANGE

|  | UWL | URL | AWL | ARL | UWS | URS | AWS | ARS |
|---|---|---|---|---|---|---|---|---|
| UWL | YES | NO | NO | NO | YES | NO | NO | NO |
| URL | YES | YES | YES | NO | YES | YES | YES | NO |
| AWL | YES | YES | YES | YES | YES | YES | YES | YES |
| ARL | YES | YES | YES | YES | YES | YES | YES | YES |
| UWS | YES | YES | YES | YES | YES | NO | NO | NO |
| URS | YES | YES | YES | YES | YES | YES | YES | NO |
| AWS | YES | YES | YES | YES | YES | YES | YES | YES |
| ARS | YES | YES | YES | YES | YES | YES | YES | YES |

ITEM VALUE AFTER CHANGE

YES: POSSIBLE TO CHANGE
NO: NOT POSSIBLE TO CHANGE

FIG.3

LARGE TO LARGE    ITEM VALUE BEFORE CHANGE

|  | UW | UR | AW | AR |
|---|---|---|---|---|
| UW | YES | NO | NO | NO |
| UR | YES | YES | YES | NO |
| AW | YES | YES | YES | YES |
| AR | YES | YES | YES | YES |

ITEM VALUE AFTER CHANGE

YES: POSSIBLE TO CHANGE
NO: NOT POSSIBLE TO CHANGE

FIG.4

SMALL TO LARGE    ITEM VALUE BEFORE CHANGE

| | UW | UR | AW | AR |
|---|---|---|---|---|
| UW | YES | NO | NO | NO |
| UR | YES | YES | YES | NO |
| AW | YES | YES | YES | YES |
| AR | YES | YES | YES | YES |

ITEM VALUE AFTER CHANGE (row labels)

YES: POSSIBLE TO CHANGE
NO: NOT POSSIBLE TO CHANGE

FIG.5

LARGE TO SMALL    ITEM VALUE BEFORE CHANGE

| | UW | UR | AW | AR |
|---|---|---|---|---|
| UW | YES | YES | YES | YES |
| UR | YES | YES | YES | YES |
| AW | YES | YES | YES | YES |
| AR | YES | YES | YES | YES |

ITEM VALUE AFTER CHANGE (row labels)

YES: POSSIBLE TO CHANGE
NO: NOT POSSIBLE TO CHANGE

FIG.6

SMALL TO SMALL    ITEM VALUE BEFORE CHANGE

|                      |    | UW  | UR  | AW  | AR  |
|----------------------|----|-----|-----|-----|-----|
| ITEM VALUE AFTER CHANGE | UW | YES | NO  | NO  | NO  |
|                      | UR | YES | YES | YES | NO  |
|                      | AW | YES | YES | YES | YES |
|                      | AR | YES | YES | YES | YES |

YES: POSSIBLE TO CHANGE
NO: NOT POSSIBLE TO CHANGE

FIG.7

ITEM VALUE BEFORE CHANGE

|                         |    | AR  | AW  | UR  | UW  |
|-------------------------|----|-----|-----|-----|-----|
| ITEM VALUE AFTER CHANGE | UW | UNK | UNK | UNK | YES |
|                         | UR | UNK | YES | YES | YES |
|                         | AW | YES | YES | YES | YES |
|                         | AR | YES | YES | YES | YES |

YES: POSSIBLE TO CHANGE
NO: NOT POSSIBLE TO CHANGE
UNK: NEED TO SEARCH ADDITIONAL TABLE

FIG.8

|  | L TO L | S TO L | L TO S | S TO S |
|---|---|---|---|---|
| UR TO UW | NO | YES | NO | NO |
| AW TO UW | NO | YES | NO | NO |
| AR TO UW | NO | YES | NO | NO |
| AR TO UR | NO | YES | NO | NO |

YES: POSSIBLE TO CHANGE
NO: NOT POSSIBLE TO CHANGE

AUTHORITY CHANGING DEVICE, GENERATING DEVICE, AND COMPUTER PROGRAM PRODUCT

CROSS-REFERENCE TO RELATED APPLICATION(S)

This application is based upon and claims the benefit of priority from Japanese Patent Application No. 2012-062290, filed on Mar. 19, 2012; the entire contents of which are incorporated herein by reference.

FIELD

Embodiments described herein relate generally to an authority changing device, a generating device and a computer program product.

BACKGROUND

A known control technology of access to a database includes RBAC (Role Based Access Control) defined in IEC (International Electrotechnical Commission) 62351-8.

However, the RBAC described in IEC 62351-8 is not assumed to introduce a geometrical relation between targets to be accessed.

DETAILED DESCRIPTION

In an embodiment, a first authority is defined by a first combination that includes a first item value indicative of a role, a second item value indicative of an operation, and a third item value indicative of a geometrical relation. A second authority is defined by a second combination of a fourth item value indicative of the role, a fifth item value indicative of the operation, and a sixth item value indicative of the geometrical relation. An authority changing device according to an embodiment includes a logical expression storage, a table storage, a first determiner, a second determiner, and a changing unit. The logical expression storage is configured to store therein a logical expression to indicate whether the change from the first authority to the second authority is possible, not possible, or unknown, based on the first item value, the second item value, the fourth item value, and the fifth item value. The table storage is configured to store therein a first table that defines an availability of change of access authority from the first authority to the second authority, based on a pattern where the availability of change of access authority from the first authority to the second authority is unknown, and based on the third item value, and the sixth item value. The first determiner is configured to use the logical expression so as to determine whether the change from the first authority to the second authority is possible, not possible, or unknown. The second determiner is configured to, when the availability of change of access authority is determined to be unknown, use the first table so as to determine the availability of change from the first authority to the second authority. The changing unit is configured to, when the change from the first authority to the second authority is determined to be possible, change the first authority to the second authority.

Various embodiments will be described in detail with reference to the accompanying drawings.

First Embodiment

Figure 1:
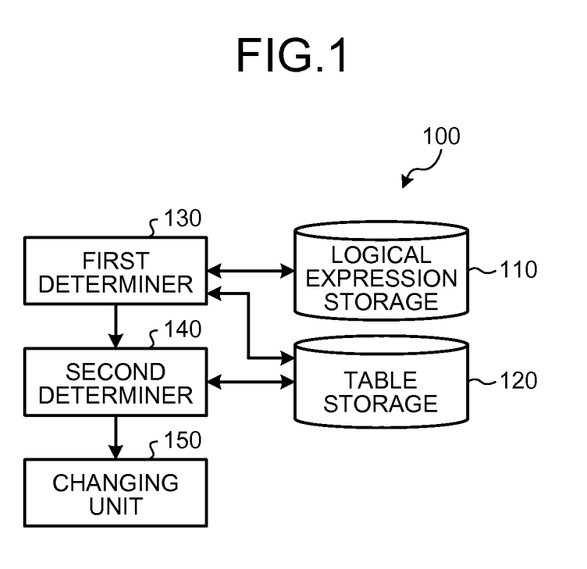
FIG. 1 is a block diagram illustrating an example of an authority changing device according to a first embodiment.

FIG. 1 is a block diagram illustrating an exemplary authority changing device 100 according to a first embodiment.

The authority changing device 100 changes access authority of a target for access control in a RBAC (Role Based Access Control). Especially, the first embodiment is assumed to introduce an inclusion relation between targets to be accessed. A target to be accessed before the change is assumed to have an inclusion relation with a target to be accessed after the change.

In view of this, while the commonly-used RBAC defines a combination of two items, "role" and "right", as an access authority of the target for access control, the first embodiment defines a combination of three items, "role", "right", and additionally "area", as access authority of a target for access control. That is, while the access authority of a target for access control in the commonly-used RBAC is defined by a two-dimensional item ("role" and "right"), the access authority of a target for access control in the first embodiment is defined by a three-dimensional item ("role", "right", and "area").

"role" (an example of the first item) is an item indicative of a role. In the first embodiment, a description will be given of a case where item values of "role" are assumed to include Administrator (hereinafter occasionally referred to as "A") and User (hereinafter occasionally referred to as "U"). However, the first embodiment is not limited to these.

"right" (an example of the second item) is an item indicative of an operation. In the first embodiment, a description will be given of a case where item values of "right" are assumed to include Read (hereinafter occasionally referred to as "R") and Read and Write (hereinafter occasionally referred to as "W"). However, the first embodiment is not limited to these.

"area" (an example of the third item) is an item indicative of an inclusion relation. In the first embodiment, a description will be given of a case where item values of "area" are assumed to include Large and Small. However, the first embodiment is not limited to these. "Large" is assumed to include "Small".

Figure 2:
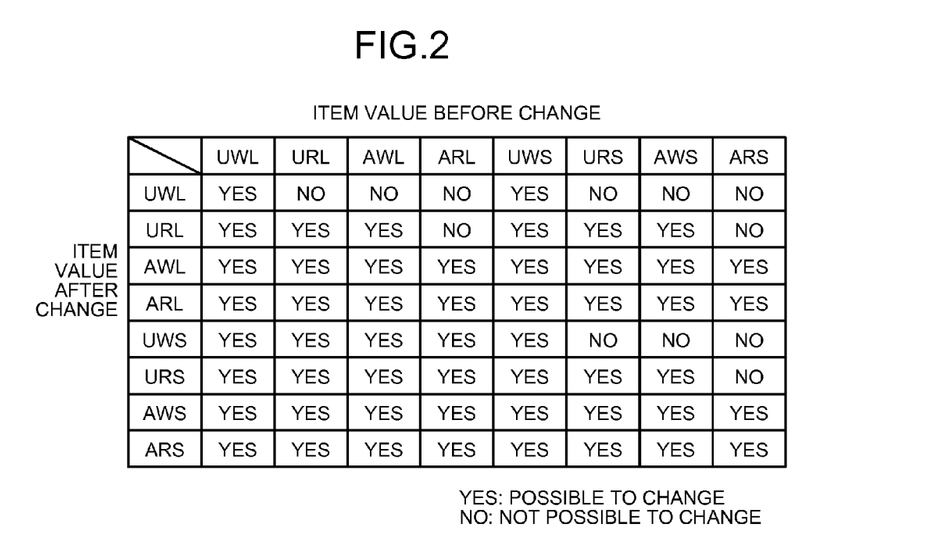
FIG. 2 is a table illustrating an example of original table according to the first embodiment.

FIG. 2 is a table illustrating an example of an original table indicative of availability of change of access authority according to the first embodiment. The original table (an example of a third table) in FIG. 2 uses a combination of item values, "role", "right", and "area" (hereinafter occasionally referred to as "a first combination") before the change of access authority, and also includes a combination of item values, "role", "right", and "area" (hereinafter occasionally referred to as "a second combination") after the change of access authority. This table defines an availability of change from access authority (hereinafter occasionally referred to as "first access authority") defined by the first combination to access authority (hereinafter occasionally referred to as "second access authority") defined by the second combination. "YES" indicates that the change of access authority is possible while "NO" indicates that the change of access authority is impossible. While the original table in FIG. 2 is the table that defines the availability of change of access authority from the first access authority to the second access authority with the three-dimensional items ("role", "right", and "area"), the original table is not limited to these tables.

Figure 3:
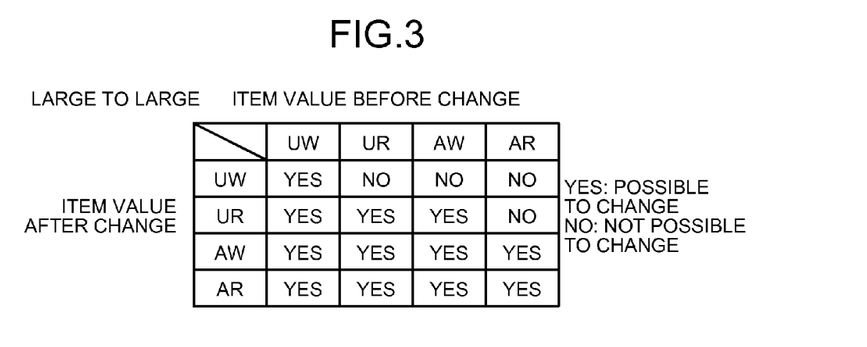
FIG. 3 is a table illustrating another example of original table according to the first embodiment.
Figure 4:
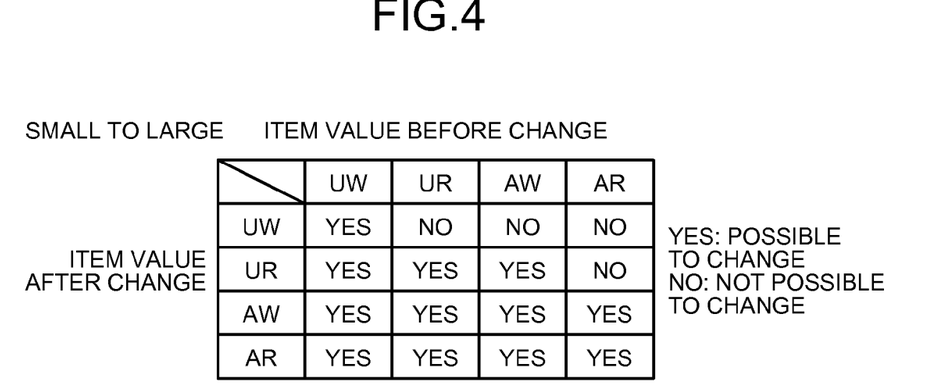
FIG. 4 is a table illustrating still another example of original table according to the first embodiment.
Figure 5:
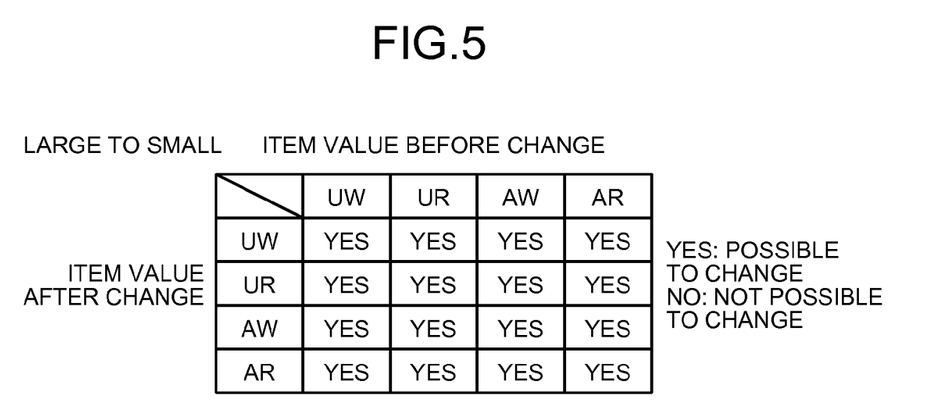
FIG. 5 is a table illustrating still another example of original table according to the first embodiment.
Figure 6:
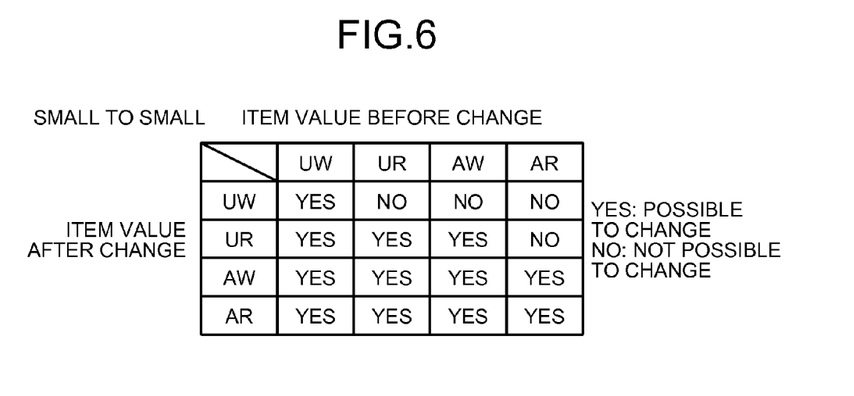
FIG. 6 is a table illustrating still another example of original table according to the first embodiment.

FIGS. 3 to 6 are tables illustrating other examples of original tables indicative of the availability of change of access authority according to the first embodiment. These tables define the availability of change of access authority from the first access authority to the second access authority with the two-dimensional items ("role" and "right") for each combination of the item value of area for the first combination and the item value of "area" for the second combination. FIG. 3 is a table that defines the availability of change of access authority from the first access authority to the second access authority with the item values of "role" and "right" in the case where the item value of "area" for the first combination is "Large" and the item value of "area" for the second combination is "Large". FIG. 4 is a table that defines the availability of change of access authority from the first access authority to the second access authority with the item values of "role" and "right" in the case where the item value of "area" for the first combination is "Small" and the item value of "area" for the second combination is "Large". FIG. 5 is a table that defines the availability of change of access authority from the first access authority to the second access authority with the item values of "role" and right in the case where the item value of "area" for the first combination is "Large" and the item value of "area" for the second combination is "Small". FIG. 6 is a table that defines the availability of change of access authority from the first access authority to the second access authority with the item values of "role" and right in the case where the item value of "area" for the first combination is "Small" and the item value of "area" for the second combination is "Small". The original tables in FIGS. 3 to 6 illustrate the same content of availability of change of access authority from the first access authority to the second access authority as those illustrated by the original table in FIG. 2. Thus, the availability of change of access authority will not be further elaborated here.

In FIG. 2 to FIG. 6, item values are written in a group. For example, "UWL" means item value "U" for item "role", item value "W" for item "right", and item value "L" for item "area".

The original table in FIG. 2 and the original tables in FIGS. 3 to 6 are based on a policy that does not permit a change of access authority that may cause a situation where resources to be protected before the change of access authority are unprotected after the change of access authority.

For example, in the original table of FIG. 2, assume that the item value of "role" is "A", the item value of "right" is "W", and the item value of "area" is "Small" for the first combination. Further, assume that the item value of "role" is "U", the item value of "right" is "W", and the item value of "area" is "Small" for the second combination in the original table of FIG. 2 (which corresponds to the case where the item value of "role" is "A" while the item value of "right" is "W" for the first combination, and the item value of "role" is "U" while the item value of "right" is "W" for the second combination in the original table of FIG. 6 among FIGS. 3 to 6). In this case, changing "role" from Administrator to User removes restrictions on "role". Thus, such change of access authority is not possible ("NO").

For example, in the original table of FIG. 2, assume that the item value of "role" is "U", the item value of "right" is "R", and the item value of "area" is "Large" for the first combination. Further, assume that the item value of "role" is "U", the item value of "right" is "W", and the item value of "area" is "Large" for the second combination in the original table of FIG. 2 (which corresponds to the case where the item value of "role" is "U" while the item value of "right" is "R" for the first combination, and the item value of "role" is "U" while the item value of "right" is "W" for the second combination in the original table of FIG. 3 among FIGS. 3 to 6). In this case, changing "right" from Read to Read and Write removes restriction on "right". Thus, the change of access authority is not possible ("NO").

For example, assume that the item value of "role" is "A", the item value of "right" is "W", and the item value of "area" is "Small" for the first combination in the original table of FIG. 2. Further, assume that the item value of "role" is "U", the item value of "right" is "W", and the item value of "area" is "Large" for the second combination in the original table of FIG. 2 (which corresponds to the case where the item value of "role" is "A" while the item value of "right" is "W" for the first combination, and the item value of "role" is "U" while the item value of "right" is "W" for the second combination in the original table of FIG. 4 among FIGS. 3 to 6). In this case, with respect to Small included in Large, changing "role" from Administrator to User removes the restrictions on "role". Thus, the change of access authority is not possible ("NO").

However, Administrator is assumed to have full authority. Thus, in the case where the item value of "role" for the second combination is "A", the change of access authority is possible ("YES") regardless of the item value of "area" or "right" for the second combination.

In the first embodiment, the authority changing device 100 does not use the original table in FIG. 2 or the original tables in FIGS. 3 to 6 as they are, but uses a table that includes replaced information to make the change of access authority more efficient, so as to make the change of access authority more efficient. Specifically, the authority changing device 100 uses a logical expression to provide elements of an RR table (an example of a second table) with which the original table in FIG. 2 or the original tables in FIGS. 3 to 6 are replaced. Further, the authority changing device 100 also uses an additional table (an example of a first table) with which the original table in FIG. 2 or the original tables in FIGS. 3 to 6 are replaced. With the use of these tables, the authority changing device 100 changes access authority of a target for access control.

The original table in FIG. 2 and the original tables in FIGS. 3 to 6 define the availability of change of access authority from the first access authority to the second access authority with the item values of "role", "right", and "area".

However, the original table in FIG. 2 and the original tables in FIGS. 3 to 6 include many patterns in which the availability of change of access authority from the first access authority to the second access authority is determined by the item values of "role" and "right", that is, the availability of change of access authority from the first access authority to the second access authority is determined regardless of the item value of "area".

For example, in the original table of FIG. 2 or in the original tables of FIGS. 3 to 6, in the case where the item value of "role" is "U" and the item value of "right" is "W" for the first combination while the item value of "role" is "U" and the item value of "right" is "R" for the second combination, the change of access authority is possible (YES) regardless of the item value of "area".

In view of this, for changing access authority, the authority changing device 100 does not use the original table in FIG. 2, which defines the availability of change of access authority from the first access authority to the second access authority with the three-dimensional item ("role", "right", and "area"), or the original tables in FIGS. 3 to 6, which define the availability of change of access authority from the first access authority to the second access authority with the two-dimensional item ("role" and "right") for each combination of the item value of "area" for the first combination and the item value of "area" for the second combination. For changing access authority, the authority changing device 100 uses the RR table, which defines whether the change from the first access authority to the second access authority with the two-dimensional item (role and right) is possible, not possible or unknown, and the additional table, which defines the availability of change of access authority from the first access authority to the second access authority with the three-dimensional item ("role", "right", and "area") for a pattern with unknown availability of change of access authority from the first access authority to the second access authority.

Figure 7:
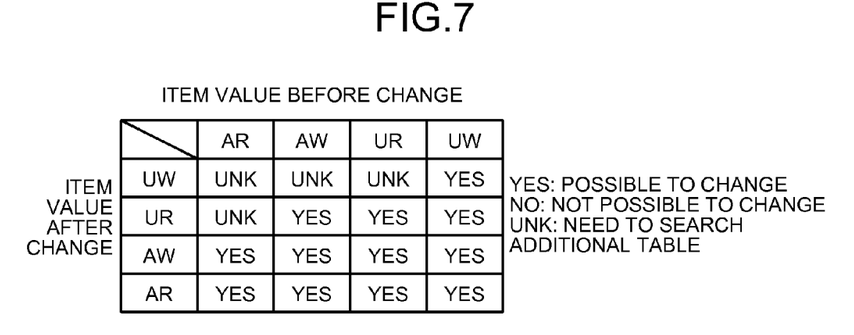
FIG. 7 is a table illustrating an example of RR table according to the first embodiment.

FIG. 7 is a table illustrating an example of an RR table with which the original table in FIG. 2 or the original tables in FIGS. 3 to 6 are replaced. The RR table in FIG. 7 defines whether the change from the first access authority to the second access authority is possible, not possible, or unknown, as elements, based on "role" and "right" of the first combination and the second combination. "YES" indicates that the change of access authority is possible, "NO" indicates that change of access authority is not possible (now shown in FIG. 7), and "UNK" indicates that change of access authority is unknown.

Figure 8:
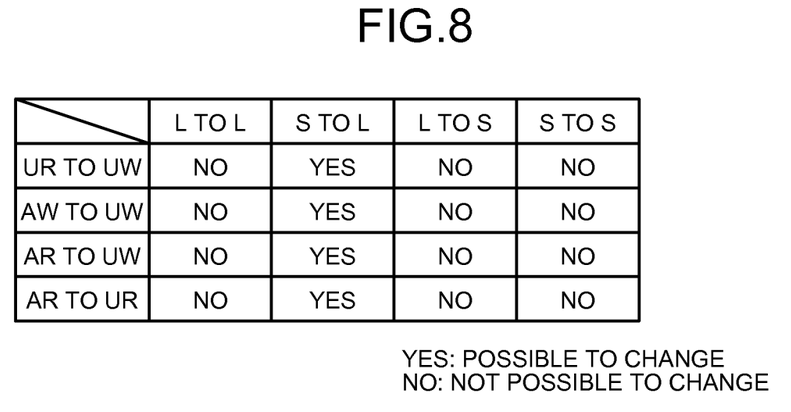
FIG. 8 is a table illustrating an example of additional table according to the first embodiment.

FIG. 8 is a table illustrating an example of an additional table with which the original table in FIG. 2 or the original tables in FIGS. 3 to 6 are replaced. The additional table in FIG. 8 defines the availability of change of access authority from the first access authority to the second access authority based on a pattern (a pattern of "UNK") indicative of unknown availability of change of access authority from the first access authority to the second access authority in the RR table and based on "area" of the first combination and "area" of the second combination. "YES" indicates that change of access authority is possible while "NO" indicates change of access authority is not possible.

Thus, the RR table in FIG. 7 and the additional table in FIG. 8 have a data size that is smaller than that of the whole original table in FIG. 2 or the whole original table in any one of FIGS. 3 to 6. Accordingly, the authority changing device 100 uses the RR table in FIG. 7 and the additional table in FIG. 8, thus making the change of access authority more efficient.

Especially in the first embodiment, the authority changing device 100 uses the content of the RR table in FIG. 7, that is, a logical expression to indicate whether change from the first access authority to the second access authority is possible, not possible, or unknown, based on "role" and "right" of the first and second combinations. This consequently reduces the data size, thus making the change of access authority more efficient.

The RR table in FIG. 7 is configured such that specific elements are gathered in a specific region. Specifically, the first combinations are arranged starting from a combination of "role" with high authority and "right" with low authority to a combination of "role" with low authority and "right" with high authority. The second combinations are arranged starting from a combination of "role" with low authority and "right" with high authority to a combination of "role" with high authority and "right" with low authority. The elements of "UNK" are gathered in the left upper side in the RR table.

Thus, in the first embodiment, the content of the RR table in FIG. 7 is expressed by a simple logical expression. For example, in the case where an element number i ($1 \leq i \leq 16$) is set in an order of the first column in the first row, the second column in the first row, the third column in the first row, the fourth column in the first row, the first column in the second row, ..., and the fourth column in the fourth row in the RR table of FIG. 7, the RR table in FIG. 7 is expressed by a first logical expression of Formula (1) and a second logical expression of Formula (2).

$$(i<1) \vee (i>16) \tag{1}$$

$$(i<6) \wedge (i \neq 4) \tag{2}$$

The first logical expression (Formula (1)) is a logical expression to provide a pattern where the change from the first access authority to the second access authority is not possible. The second logical expression (Formula (2)) is a logical expression to provide a pattern where the change from the first access authority to the second access authority is unknown.

On the premise of the above description, returning to FIG. 1 again, a configuration of the authority changing device 100 will be described. The authority changing device 100 includes a logical expression storage 110, a table storage 120, a first determiner 130, a second determiner 140, and a changing unit 150 as illustrated in FIG. 1.

The logical expression storage 110 and the table storage 120 are implemented in a storage that stores information with at least one of magnetic, optical, and electrical methods. The storage may be, for example, a Hard Disk Drive (HDD), a Solid State Drive (SSD), a Random Access Memory (RAM), a memory card, or a similar type of storage. The first determiner 130, the second determiner 140, and the changing unit 150 are implemented by execution of a program (or software) in a processing unit such as a Central Processing Unit (CPU).

The logical expression storage 110 stores therein the logical expression. While in the first embodiment, the logical expression storage 110 stores the first logical expression (Formula (1)) and the second logical expression (Formula (2)) as described above, the logical expression storage 110 is not limited to these expressions, and can store other typical expressions.

The table storage 120 stores therein the RR table and the additional table. While in the first embodiment, the table storage 120 stores therein the RR table in FIG. 7 and the additional table in FIG. 8, the table storage 120 is not limited to these tables, and can also store other typical tables.

The first determiner 130 uses the logical expression to determine whether the change from the first access authority to the second access authority is possible, not possible, or unknown. Specifically, the first determiner 130 applies the element number indicative of the element in the RR table of FIG. 7 to the logical expression, so as to determine whether the change from the first access authority to the second access authority is possible, not possible, or unknown.

In the first embodiment, the first determiner 130 specifies the element number indicative of the element in the RR table of FIG. 7 based on the item values of "role" and "right" for the first combination and the item values of "role" and "right" for the second combination. Then, the first determiner 130 applies the specified element number to the first logical expression so as to determine whether the change from the first access authority to the second access authority is not possible. The first determiner 130 applies the specified element number to the second logical expression to determine whether availability of change of access authority from the first access authority to the second access authority is unknown. In the case where the change from the first access authority to the second access authority is neither not possible nor unknown, the first determiner 130 determines that the change from the first access authority to the second access authority is possible.

In the case where the first determiner 130 determines that the change from the first access authority to the second access authority is unknown, the second determiner 140 uses the additional table to determine whether change of access authority from the first access authority to the second access authority is possible.

In the first embodiment, the second determiner 140 applies both of a pattern where availability of change of access authority from the first access authority to the second access authority is determined to be unknown and the item values of "area" of the first and second combinations, to the additional table of FIG. 8. Then, the second determiner 140 determines whether change of access authority from the first access authority to the second access authority is possible.

In the case where the first determiner 130 determines that the change from the first access authority to the second access authority is possible, or in the case where the second determiner 140 determines that the change from the first access authority to the second access authority is possible, the changing unit 150 changes the first access authority to the second access authority.

Figure 9:
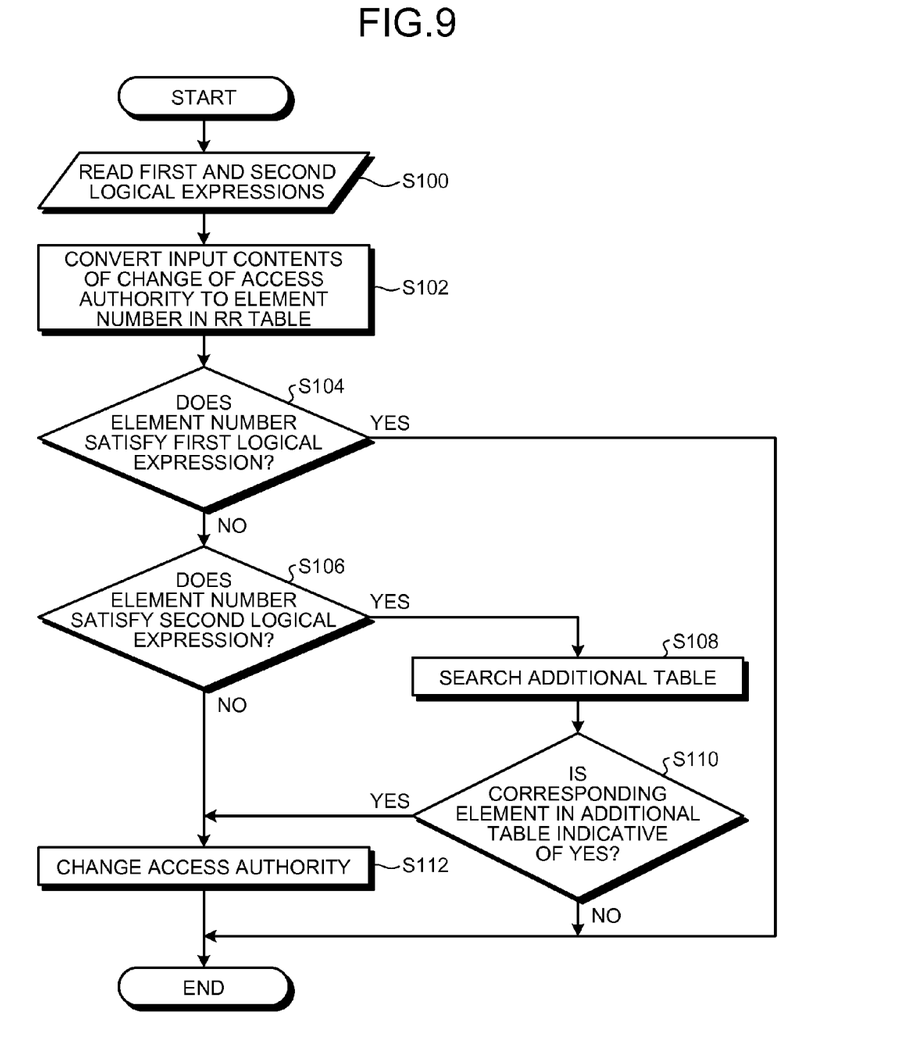
FIG. 9 is a flowchart illustrating an example of operations of a change of access authority according to the first embodiment.

FIG. 9 is a flowchart illustrating a typical example of operations performed by the authority changing device 100 according to the first embodiment.

First, the first determiner 130 reads out the first logical expression (Formula (1)) and the second logical expression (Formula (2)) from the logical expression storage 110 (step S100).

Subsequently, the first determiner 130 receives inputs of the first combination and the second combination that are contents of the change of access authority. Then, the first determiner 130 specifies the element number i of the corresponding element in the RR table of FIG. 7 based on the received item values of "role" and "right" for the first combination and the received item values of "role" and "right" for the second combination. Accordingly, the first determiner 130 converts the received contents of the change of access authority to the element number i in the RR table of FIG. 7 (step S102).

Subsequently, the first determiner 130 applies the specified element number i to the first logical expression. Then, the first determiner 130 determines whether or not the element number i satisfies the first logical expression, that is, determines whether the change from the first access authority to the second access authority is not possible (step S104).

Here, in the case where the element number i is not from 1 to 16 and satisfies the first logical expression (Yes in step S104), the change from the first access authority to the second access authority is not possible. Thus, the processing terminates.

On the other hand, the element number i is one of 1 to 16 and does not satisfy the first logical expression (No in step S104), the first determiner 130 applies the specified element number i to the second logical expression. Then, the first determiner 130 determines whether or not the element number i satisfies the second logical expression, that is, determines whether or not availability of change of access authority from the first access authority to the second access authority is unknown (step S106).

Here, in the case where the element number i is one of 4 and 6 to 16 and does not satisfy the second logical expression (No in step S106), the change from the first access authority to the second access authority is possible. Thus, the processing proceeds to step S112.

On the other hand, the element number i is one of 1 to 3 and 5 and satisfies the second logical expression (Yes in step S106), the availability of change of access authority from the first access authority to the second access authority is unknown. Accordingly, the second determiner 140 searches the additional table in FIG. 8 (step S108). Specifically, the second determiner 140 applies a pattern where availability of change of access authority from the first access authority to the second access authority is determined to be unknown, and the item values of "area" for the first and second combinations to the additional table in FIG. 8. Then, the second determiner 140 determines whether change of access authority from the first access authority to the second access authority is possible.

In the case where the corresponding element in the additional table of FIG. 8 is indicative of "NO" (No in step S110), the change from the first access authority to the second access authority is not possible. Thus, the processing terminates.

On the other hand, the corresponding element in the additional table of FIG. 8 is indicative of "YES" (Yes in step S110), the change from the first access authority to the second access authority is possible. Thus, the changing unit 150 changes the first access authority to the second access authority (step S112).

As described above, in the first embodiment, the access authority of the target for access control is defined by the combination of the three items, which include "role", "right", and "area". Then, in the case where the item value of "role" or "right" before the change of access authority is a restricted item value, the authority changing device 100 changes the access authority based on the policy that does not permit a change of access authority that may cause a situation where the restriction is removed and thus resources to be protected before the change of access authority are not protected after the change of access authority. Therefore, according to the first embodiment, in the case where setting of access authority is changed with change of "area", it becomes possible to change authorities of targets that have a geometrical relation to one another without inconsistency.

In the first embodiment, the authority changing device 100 does not use the original table that defines the availability of change of access authority from the first access authority to the second access authority with the three-dimensional items ("role", "right", and "area") when changing access authority. The authority changing device 100 does not also use the original table that defines the availability of change of access authority from the first access authority to the second access authority with the two-dimensional items ("role" and "right") for each combination of the item value of "area" for the first combination and the item value of "area" for the second combination when changing access authority. The authority changing device 100 uses the RR table, which defines whether change from the first access authority to the second access authority with two-dimensional items (role and right) is possible, not possible, or unknown when changing access authority, and also uses the additional table, which defines the availability of change of access authority from the first access authority to the second access authority with the three-dimensional items ("role", "right", and "area") regarding the pattern with unknown availability of change of access authority from the first access authority to the second access authority in the RR table when changing access authority. The authority changing device 100 consequently changes access authority. The RR table is generated by, for example, comparing the respective two-dimensional original tables with one another. Therefore, according to the first embodiment, it is possible to reduce the size of information that is needed for the change of access authority, thus ensuring more efficient change of access authority.

Specifically, in the first embodiment, the authority changing device 100 uses the logical expression to provide the content of the RR table based on "role" and "right" of the first combination and "role" and "right" of the second combination. This makes it possible to reduce the size of information that is needed of the change of access authority, thus ensuring the more efficient change of access authority.

In the first embodiment, the RR table is configured such that the specific elements are gathered in the specific region. This allows the simple logical expression to express the contents of the RR table, thus ensuring the more efficient change of access authority.

Second Embodiment

In a second embodiment, a description will be given of an example where the authority changing device generates an RR table, a logical expression, and an additional table. Differences from the first embodiment will be mainly described below. Like names and reference numerals designating elements with functions corresponding or identical to those of the first embodiment, and therefore such elements will not be further elaborated here.

Figure 10:
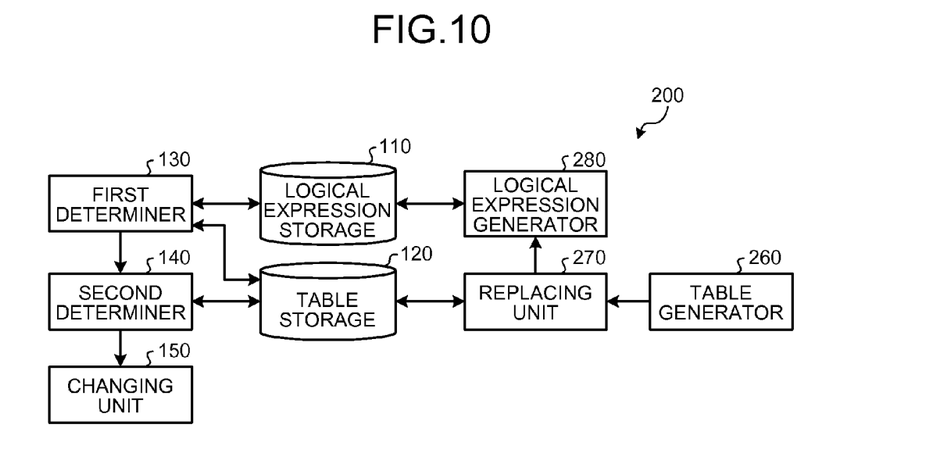
FIG. 10 is a block diagram illustrating an example of an authority changing device according to a second embodiment.

FIG. 10 is a block diagram illustrating an example of an authority changing device 200 according to the second embodiment. As illustrated in FIG. 10, the authority changing device 200 of the second embodiment differs from the authority changing device 100 of the first embodiment in that the authority changing device 200 further includes a table generator 260, a replacing unit 270, and a logical expression generator 280.

The table generator 260 generates the original table. In the second embodiment, the table generator 260 generates the original table in FIG. 2 or the original tables in FIGS. 3 to 6 based on the above-described policy (the policy that does not permit a change of access authority that may cause a situation where resources to be protected before the change of access authority are not protected after the change of access authority).

The replacing unit 270 replaces the original table, which is generated by the table generator 260, with the RR table and the additional table, and stores the tables in the table storage 120. In the second embodiment, the replacing unit 270 replaces the original table in FIG. 2 or the original tables in FIGS. 3 to 6 with the RR table in FIG. 7 and the additional table in FIG. 8. The RR table in FIG. 7 defines whether the change from the first access authority to the second access authority with the two-dimensional items ("role" and "right") is possible, not possible, or unknown. The additional table in FIG. 8 defines the availability of change of access authority from the first access authority to the second access authority with the three-dimensional items ("role", "right", and "area") for a pattern with unknown availability of change of access authority from the first access authority to the second access authority.

When the replacing unit 270 replaces the original table in FIG. 2 or the original tables in FIGS. 3 to 6 with the RR table in FIG. 7, the replacing unit 270 arranges the first combinations starting from a combination of "role" with high authority and "right" with low authority to a combination of "role" with low authority and "right" with high authority. Further, the replacing unit 270 arranges the second combinations starting from a combination of "role with low authority and "right" with high authority to a combination of "role" with high authority and "right" with low authority. This gathers the elements of "UNK" in the left upper side in the RR table, thus facilitating generation of the logical expression by the logical expression generator 280.

The logical expression generator 280 generates the logical expression from the RR table replaced by the replacing unit 270, and stores the generated logical expression in the logical expression storage 110. In the second embodiment, the logical expression generator 280 generates the first logical expression (Formula (1)) and the second logical expression (Formula (2)) from the RR table in FIG. 7. The first logical expression provides the pattern where the change from the first access authority to the second access authority is not possible. The second logical expression provides the pattern where availability of change of access authority from the first access authority to the second access authority is unknown. However, the logical expression is not limited to these logical expressions.

Figure 11:
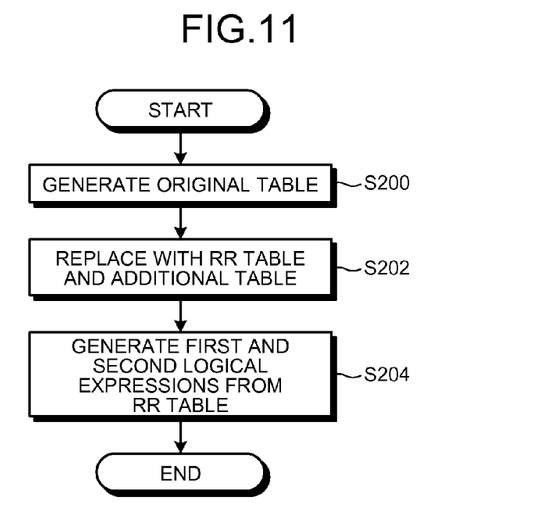
FIG. 11 is a flowchart illustrating an example of operations for generating access authority change information according to the second embodiment.

FIG. 11 is a flowchart illustrating an example of operations for generating access authority change information by the authority changing device 200 according to the second embodiment.

First, the table generator 260 generates the original table (step S200).

Subsequently, the replacing unit 270 replaces the original table, which is generated by the table generator 260, with the RR table and the additional table. The replacing unit 270 stores the replaced tables in the table storage 120 (step S202).

Subsequently, the logical expression generator 280 generates the logical expression from the RR table, which is replaced by the replacing unit 270, and stores the generated logical expression in the logical expression storage 110 (step S204).

As described above, in the second embodiment, the authority changing device 200 replaces the original table with the RR table and the additional table. The original table is either one of two original tables. One is the original table that defines the availability of change of access authority from the first access authority to the second access authority with the three-dimensional items ("role", "right", and "area"), and the other is the original table that defines the availability of change of access authority from the first access authority to the second access authority with the two-dimensional items ("role" and "right") for each combination of the item values of "area" for the first and second combinations. The RR table defines whether the change from the first access authority to the second access authority with the two-dimensional items (role and right) is possible, not possible, or unknown. The additional table defines the availability of change of access authority from the first access authority to the second access authority with the three-dimensional items ("role", "right", and "area") for the pattern where availability of change of access authority from the first access authority to the second access authority is unknown. Thus, according to the second embodiment, it is possible to reduce the size of information that is needed for the change of access authority, thus ensuring the more efficient change of access authority.

Especially in the second embodiment, the authority changing device 200 generates the logical expression that provides the content of the RR table based on "role" and "right" of the first combination and "role" and "right" of the second combination. This reduces the size of information that is needed for the change of access authority, thus ensuring the more efficient processing for changing access authority.

The second embodiment configures the RR table to gather the specific elements in the specific region. This allows the simple logical expression to express the content of the RR table, thus ensuring the more efficient change of access authority.

Modification

In the above-described second embodiment, the example has been described in which the authority changing device 200 executes both an operation for generating the information needed for the change of access authority that includes the RR table, the logical expression, the additional table, and similar information and an operation for changing access authority. However, the generation of the information needed for the change of access authority and the change of access authority may be executed by different devices.

For example, a generating device may be separately prepared to generate the information needed for the change of access authority that includes the RR table, the logical expression, the additional table, and similar information, which were described in the second embodiment. In this configuration, the authority changing device may execute the change of access authority as described in the first embodiment.

In each embodiment described above, a description has been given of the example where the inclusion relation is introduced between the targets to be accessed, so as to change the setting of access authority along with the change in inclusion relation. However, the embodiment is not limited to this configuration. The present invention is applicable to a case where an adjacency relation is introduced between the targets to be accessed, so as to change the setting of access authority along with the change in adjacency relation. In a broader sense, the present invention is applicable to a case where a geometrical relation is introduced between the targets to be accessed, so as to change the setting of access authority along with the change in geometrical relation.

While in each embodiment described above, the change of access authority is described as an example, the present invention is applicable to change in authority other than access authority.

Hardware Configuration

The authority changing device and the generating device in each embodiment and modification described above includes a control unit such as a CPU, a storage such as a Read Only Memory (ROM), a Random Access Memory (RAM), an external memory such as a Hard Disk Drive (HDD) and a Solid State Drive (SSD), a display unit such as a display, an input unit such as a computer mouse and a keyboard, and a communication I/F. This may be implemented with a hardware configuration using a commonly-used computer.

A program executed by the authority changing device and the generating device in each embodiment and modification described above is provided as a file in an installable format or an executable format. This program is stored in a computer-readable media such as a CD-ROM, a CD-R, a memory card, a DVD, and a flexible disk (FD).

The program executed by the authority changing device and the generating device in each embodiment and modification described above may be stored on a computer coupled to a network such as the Internet, and may be downloaded through the network. The program executed by the authority changing device and the generating device in each embodiment and modification described above may be distributed through a network such as the Internet.

The program executed by the authority changing device and the generating device in each embodiment and modification described above may be preliminarily stored in a ROM or a similar storage.

The program executed by the authority changing device and the generating device in each embodiment and modification described above has a module configuration to implement the respective units described above on a computer. As actual hardware, for example, the control unit is configured to read out and execute the program in the storage unit from the external memory so as to implement the respective units on the computer.

Example of Application

The authority changing device and the generating device in each embodiment and modification described above are applicable to, for example, an energy management system. In the energy management system, an application program is assumed to process information related to a system and an electrical power plant using a model expressing a major target of an electric power provider.

The model expressing such a target includes, for example, a Common Information Model (CIM) defined in IEC 61970-301. In the CIM, a class diagram and a topology diagram are specified. The class diagram expresses a relation among classes indicative of targets. The topology diagram expresses a physical geometrical relation such as an adjacency relation and an inclusion relation between the targets. In view of this, in the case where an access control using a RBAC is executed on a database in the topology diagram of the CIM, the authority changing device and the generating device in each embodiment and modification described above are possibly applied.

Figure 12:
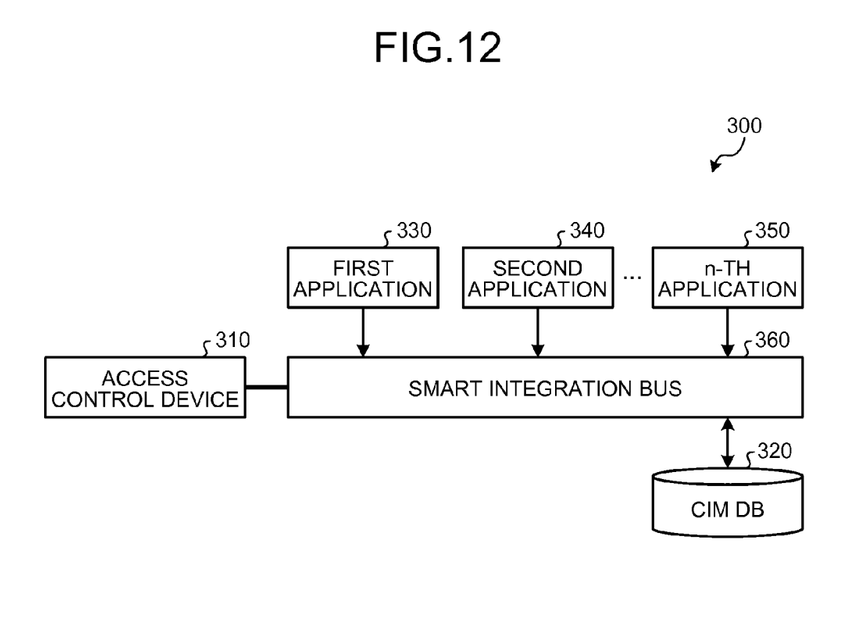
FIG. 12 is a block diagram illustrating an example of an energy management system according to an application example.

FIG. 12 is a block diagram illustrating an example of an energy management system (EMS) 300. The energy management system 300 includes an access control device 310, a CIMDB 320, a first application 330, a second application 340, . . . , an n-th application 350, and Smart Integration BUS 360.

Figure 13:
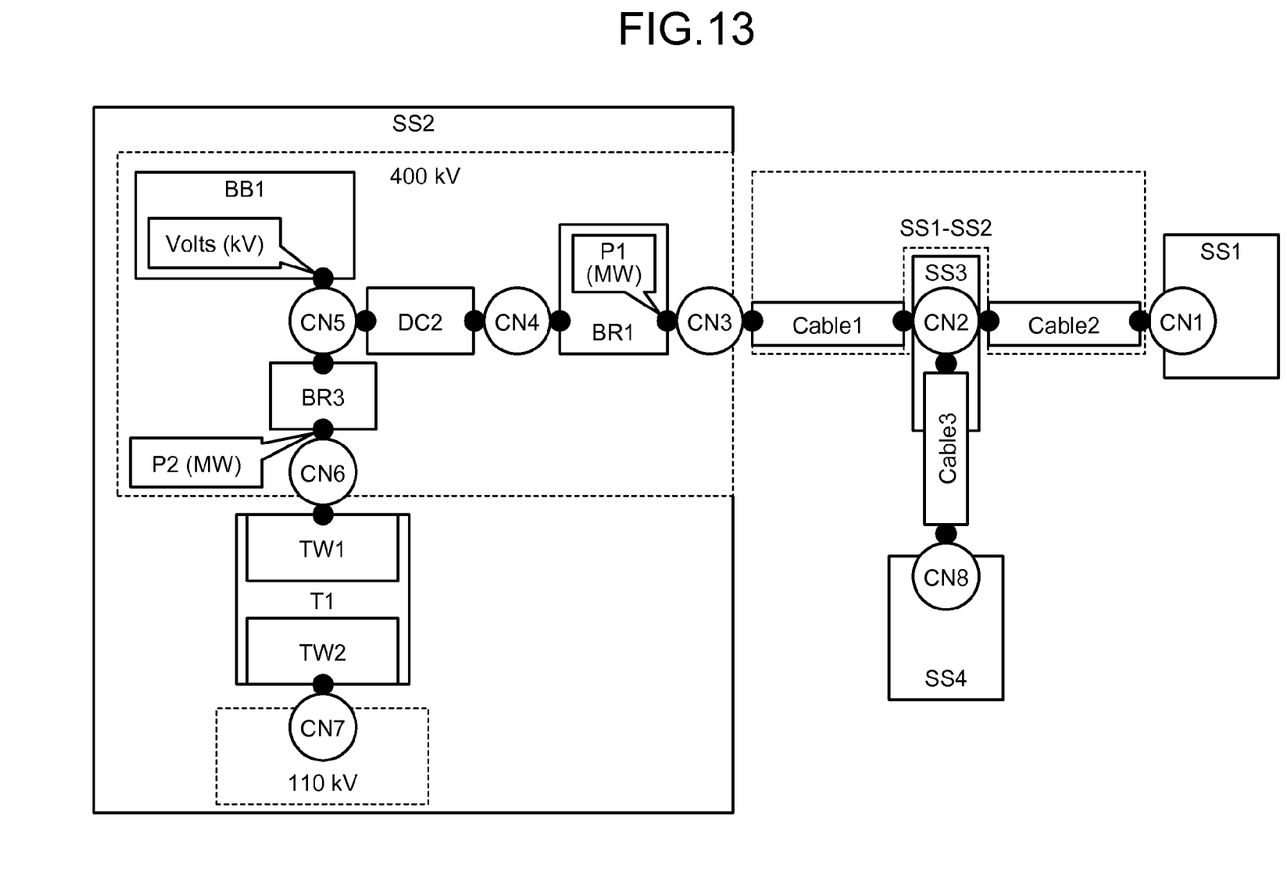
FIG. 13 is a block diagram illustrating an example of a topology diagram according to the application example.

The CIMDB 320 is a database in the topology diagram of the CIM. The CIMDB 320 stores therein, for example, the topology diagram of the CIM in FIG. 9. The topology in FIG. 13 has an inclusion relation among various objects.

The first application 330, the second application 340, . . . , and the n-th application 350 are application programs executed by the energy management system 300. These application programs access the CIMDB 320 through the Smart Integration BUS 360, and collectively access a plurality of objects in a predetermined region (in the inclusion relation).

The access control device 310 controls access to the CIMDB 320 with the first application 330, the second application 340, . . . , and the n-th application 350 in accordance with access authority of the target for access control that is defined by three items of "role", "right", and "area". In this case, "area" is an item specifying a region, which is a part of the topology diagram.

The access control device 310 changes access authority and generates access authority change information used for the change of access authority. This permits applying the authority changing device and the generating device in each embodiment and modification described above.

As described above, in the case where setting of authority is performed with the change of target to be accessed, each embodiment and modification described above changes authorities of targets that have a geometrical relation to one another without inconsistency.

The respective steps in the flowchart of each of the above-described embodiments may be executed in a modified execution order, executed at the same time, or executed in a different execution order for each execution insofar as the execution is compatible with the respective steps.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An authority changing device, in which
 a first authority is defined by a first combination that includes a first item value indicative of a role, a second item value indicative of an operation, and a third item value indicative of a geometrical relation, and
 a second authority is defined by a second combination of a fourth item value indicative of the role, a fifth item value indicative of the operation, and a sixth item value indicative of the geometrical relation,
 the device comprising:
 a logical expression storage configured to store therein a logical expression to indicate whether the change from the first authority to the second authority is possible, not possible, or unknown, based on the first item value, the second item value, the fourth item value, and the fifth item value;
 a table storage configured to store therein a first table that defines an availability of change of access authority from the first authority to the second authority, based on a pattern where the availability of change of access authority from the first authority to the second authority is unknown, and based on the third item value, and the sixth item value;
 a first determiner configured to use the logical expression so as to determine whether the change from the first authority to the second authority is possible, not possible, or unknown;
 a second determiner configured to, when the availability of change of access authority is determined to be unknown, use the first table so as to determine the availability of change from the first authority to the second authority; and
 a changing unit configured to, when the change from the first authority to the second authority is determined to be possible, change the first authority to the second authority.

2. The device according to claim 1, wherein
 the table storage further stores therein a second table that defines an element indicative of whether the change from the first authority to the second authority is possible, not possible or unknown, based on the first item value, the second item value, the fourth item value, and the fifth item value, and
 the first determiner input an element number indicative of the element of the second table to the logical expression, so as to determine whether the change from the first authority to the second authority is possible, not possible, or unknown.

3. The device according to claim 2, wherein
 the second table has a configuration in which specific elements are gathered in a specific region.

4. The device according to claim 2 further comprising:
 a table generator configured to generate a third table that defines the availability of change from the first authority to the second authority;
 a replacing unit configured to replace the third table with the first table and the second table; and
 a logical expression generator configured to generate the logical expression from the second table.

5. The device according to claim 1, wherein
 the geometrical relation is indicative of an inclusion relation.

6. An generating device, in which
 a first authority is defined by a first combination that includes a first item value indicative of a role, a second item value indicative of an operation, and a third item value indicative of a geometrical relation, and
 a second authority is defined by a second combination of a fourth item value indicative of the role, a fifth item value indicative of the operation, and a sixth item value indicative of the geometrical relation,
 the device comprising:
 a table generator configured to generate a third table that defines an availability of change from the first authority to the second authority;
 a replacing unit configured to replace the third table with a first table and a second table, the second table defining an element indicative of whether the change from the first authority to the second authority is possible, not possible or unknown, based on the first item value, the second item value, the fourth item value, and the fifth item value, the first table defining the availability of change of access authority from the first authority to the second authority based on a pattern where the availability of change of access authority from the first authority to the second authority is unknown, and based on the third item value, and the sixth item value; and
 a logical expression generator configured to generate, from the second table, a logical expression to indicate whether the change from the first authority to the second authority is possible, not possible, or unknown, based on the first item value, the second item value, the fourth item value, and the fifth item value.

7. The device according to claim 6, wherein
 the second table has a configuration in which specific elements are gathered in a specific region.

8. The device according to claim 6, wherein
the geometrical relation is indicative of an inclusion relation.

9. A computer program product comprising a non-transitory computer-readable medium containing a program, in which
a first authority is defined by a first combination that includes a first item value indicative of a role, a second item value indicative of an operation, and a third item value indicative of a geometrical relation, and
a second authority is defined by a second combination of a fourth item value indicative of the role, a fifth item value indicative of the operation, and a sixth item value indicative of the geometrical relation,
the program causing a computer to execute:
determining whether the change from the first authority to the second authority is possible, not possible, or unknown, by using a logical expression to indicate whether the change from the first authority to the second authority is possible, not possible, or unknown, based on the first item value, the second item value, the fourth item value, and the fifth item value;
determining, when the availability of change of access authority is determined to be unknown, the availability of change from the first authority to the second authority by using a first table that defines the availability of change of access authority from the first authority to the second authority, based on a pattern where the availability of change of access authority from the first authority to the second authority is unknown, and based on the third item value, and the sixth item value; and
changing, when the change from the first authority to the second authority is determined to be possible, the first authority to the second authority.

10. A computer program product comprising a non-transitory computer-readable medium containing a program, in which
a first authority is defined by a first combination that includes a first item value indicative of a role, a second item value indicative of an operation, and a third item value indicative of a geometrical relation, and
a second authority is defined by a second combination of a fourth item value indicative of the role, a fifth item value indicative of the operation, and a sixth item value indicative of the geometrical relation,
the program causing a computer to execute:
generating a third table that defines an availability of change from the first authority to the second authority;
replacing the third table with a first table and a second table, the second table defining an element indicative of whether the change from the first authority to the second authority is possible, not possible or unknown, based on the first item value, the second item value, the fourth item value, and the fifth item value, the first table defining an availability of change of access authority from the first authority to the second authority based on a pattern where the availability of change of access authority from the first authority to the second authority is unknown, and based on the third item value, and the sixth item value; and
generating, from the second table, a logical expression to indicate whether the change from the first authority to the second authority is possible, not possible, or unknown, based on the first item value, the second item value, the fourth item value, and the fifth item value.

* * * * *